United States Patent
Kozin

(10) Patent No.: US 12,137,400 B1
(45) Date of Patent: Nov. 5, 2024

(54) CONCURRENT MULTICHANNEL PROCESSING OF BLUETOOTH LOW ENERGY ADVERTISING CHANNELS

(71) Applicant: Juniper Networks, Inc., Sunnyvale, CA (US)

(72) Inventor: Vladimir Vladimirovich Kozin, Livermore, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 21 days.

(21) Appl. No.: 17/806,224

(22) Filed: Jun. 9, 2022

(51) Int. Cl.
*H04W 4/80* (2018.01)
*H04W 8/00* (2009.01)

(52) U.S. Cl.
CPC ............ *H04W 4/80* (2018.02); *H04W 8/005* (2013.01)

(58) Field of Classification Search
CPC ............................... H04W 4/80; H04W 8/005
See application file for complete search history.

(56) References Cited

U.S. PATENT DOCUMENTS

| | | | | |
|---|---|---|---|---|
| 8,954,007 | B2 * | 2/2015 | Hillyard | H04W 8/005 455/41.1 |
| 9,363,784 | B1 | 6/2016 | Friday et al. | |
| 9,699,593 | B2 | 7/2017 | Viswanadham et al. | |
| 9,706,496 | B2 | 7/2017 | Polo et al. | |
| 9,743,254 | B2 | 8/2017 | Friday et al. | |
| 9,967,803 | B2 | 5/2018 | Friday et al. | |
| 10,219,166 | B2 | 2/2019 | Friday et al. | |
| 10,932,141 | B2 * | 2/2021 | Friday | H04W 16/28 |
| 2006/0063484 | A1 * | 3/2006 | Proctor | H04B 7/15542 455/7 |
| 2013/0012144 | A1 * | 1/2013 | Besoli | H01Q 1/36 455/84 |
| 2014/0287704 | A1 * | 9/2014 | Dupuy | H04B 1/18 455/114.2 |
| 2016/0026837 | A1 * | 1/2016 | Good | G16H 40/20 340/539.13 |
| 2017/0006424 | A1 * | 1/2017 | Liin | H04W 4/023 |
| 2023/0069236 | A1 * | 3/2023 | Kozin | H04W 64/00 |

(Continued)

OTHER PUBLICATIONS

"nRF21540," Nordic Semiconductor, Retrieved from the Internet: https://www.nordicsemi.com/Products/nRF21540, First Accessed Jan. 12, 2022, 3 pp.

(Continued)

*Primary Examiner* — David Bilodeau
(74) *Attorney, Agent, or Firm* — Shumaker & Sieffert, P.A.

(57) ABSTRACT

An example device includes multiple Bluetooth Low Energy (BLE) transceivers, wherein a first BLE transceiver is configured to receive a first BLE advertising signal on a first channel of a BLE frequency band, a second BLE transceiver is configured to receive a second BLE advertising signal on a second channel of the BLE frequency band, and a third BLE transceiver is configured to receive a third BLE advertising signal on a third BLE channel. The first BLE transceiver, the second BLE transceiver, and the third BLE transceiver currently listen for the BLE advertising signals. Processing logic coupled to the BLE transceivers determines data indicative of a distance from the device to a tag that is a source of BLE advertising signals and provides the data to one of a location server or an asset management system.

20 Claims, 10 Drawing Sheets

(56) References Cited

U.S. PATENT DOCUMENTS

2023/0125903 A1* 4/2023 Kozin ................ H04W 4/029
  455/456.1

OTHER PUBLICATIONS

"Power dividers and directional couplers," Wikipedia, Retrieved from the Internet: https://en.wikipedia.org/wiki/Power_dividers_and_directional_couplers, First Accessed Jan. 12, 2022, 12 pp.

"Wilkinson Power Divider, Splitter & Combiner," Electronics Notes, Retrieved from the Internet: https://www.electronics-notes.com/articles/radio/rf-combiner-splitter-coupler-hybrid/wilkinson.php, First Accessed Jan. 12, 2022, 12 pp.

"Xinger Model PD2328J5050S2HF," Anaren, Product Data Sheet, First Accessed Jan. 12, 2022, 5 pp.

Song et al., "Efficient Advertiser Discovery in Bluetooth Low Energy Devices", Energies, vol. 12, MDPI, May 6, 2019, 17 pp.

U.S. Appl. No. 63/125,595, filed Dec. 15, 2020, naming inventor Mohammad Zohoorian.

U.S. Appl. No. 63/243,616, filed Sep. 13, 2021, naming inventor Mohammad Zohoorian.

Woolley et al., "Bluetooth Core Specification Version 5.2", Bluetooth, Dec. 9, 2020, 37 pp.

Woolley, "Bluetooth Core Specification v5.1", Bluetooth, Dec. 9, 2020, 12 pp.

\* cited by examiner

CONCURRENT MULTICHANNEL PROCESSING OF BLUETOOTH LOW ENERGY ADVERTISING CHANNELS

TECHNICAL FIELD

This disclosure relates generally to radio signals, and, more particularly, to receiving Bluetooth Low Energy advertising signals.

BACKGROUND

Knowing a location of an asset can be useful in a variety of applications. One such mechanism used to locate an asset is referred to a Bluetooth Low Energy (BLE) tag. The tag can be attached to an asset whose location is to be tracked. The BLE tag periodically "advertises" its presence via an advertising signal that is transmitted at a known frequency and channel(s). The advertising signal may carry a data packet that may include information identifying the tag. Wireless devices within the reach of the advertising signal can receive the signal, and determine, based on the signal strength of the advertising signal, a location of the tag, and thus, the location of the asset to which the tag is attached.

SUMMARY

In general, this disclosure describes techniques for wireless access points and other wireless device to receive BLE advertising signals across multiple channels of a BLE signal. BLE operates in the 2.4 GHz ISM band and spans from 2400 MHz to 2483.5 MHz. This frequency band is divided into 40 channels that are 2 MHz wide. Channels 0-36 are typically used for bi-directional data communication, and channels 37, 38 and 39 are typically used to broadcast advertising signals that advertise the presence of a BLE device. Conventionally, BLE devices provide advertising signals at one or more of channels 37, 38 and/or 39. A BLE device may use just one of channels 37, 38 or 39, or may use all three channels to advertise its presence.

As noted above, a BLE tag is a device that periodically or continuously transmits advertising signals via BLE channels, such as channels 37, 38 and/or 39. A BLE tag may also be attached at a fixed point, such as a kiosk, wall, or other portion of a building or structure. Such tags may be referred to as "beacons." Thus, the term "tag" may be used to refer to BLE devices that are integrated with, or attached to a movable object, and the term beacon may be used to refer to a BLE device that is at a fixed location. However, the terms "tag" and "beacon" are commonly considered interchangeable, and the techniques described herein can be applied for signals received from tags, beacons, or other devices using BLE to advertise their presence.

As an example of the above, a BLE tag can be attached to, or integrated with, an asset, and the location of the asset can be tracked using the signal provided by the tag. The location of the asset can be registered with an asset management system, which can track the location of assets. A BLE beacon can be attached to a kiosk, wall or other fixed location. As mobile wireless devices such as smartphones, laptop computers, table computers etc. pass by the tag, they can receive the advertising signal, and an application on the smartphone, laptop computer, or tablet computer can provide location specific information, such as advertisements for goods or services at the location, information about the location, etc.

An access point (AP) or other wireless device can determine a signal strength of the advertising signal received from a tag. In some aspects, the AP or other wireless device can determine a distance from the AP to the tag (and thus the tagged asset) based on the signal strength. As an example, the signal strength can be a Received Signal Strength Indicator (RSSI). In some aspects, the AP or other wireless device can report the distance to a tag to another system such as a location server or asset management system. In some aspects, the AP or other wireless device can report the RSSI to the location server or asset management system, which can use the RSSI to determine a distance to the tag. The location server or asset management system can use the distances to the tag received from multiple APs or other wireless devices to determine a location of the tag. RSSI values of the advertising signal that are used to determine location of a tag are typically produce a noisy signal. External factors such as such as absorption, interference, or diffraction can influence signal transmission, thus RSSI values tend to fluctuate. Also, the further away the device is from the tag, the more unstable the RSSI becomes. In view of the noise in the RSSI values, systems typically use an average (e.g., moving average) of the RSSI values to determine distance from the AP to the tag.

In some cases, in order to reduce power consumption and design complexity, a tag or beacon may only advertise on a single channel, e.g., one of channels 37, 38 or 39. Further, existing systems typically listen for advertising signals on a single channel, or iteratively scan one channel at a time (i.e., multiplex across channels 37, 38 and 39). A technical problem with existing systems is that they can miss advertising signals sent by tags or beacons on channels for which the system is not currently listening. For example, a tag may advertise its presence on channel 37, while a listening system may only listen on channel 39. As another example, a tag may advertise on channel 37, while a listening system may multiplex listening on channels 37, 38 and 39 (i.e., iterate over channels 37, 38, and 39 to listen for advertising signals). If an advertising signal is sent over channel 37 while the listing system is listening on channel 38, the listening system will miss the advertisement. Thus, existing systems can miss some or all of the advertising signals sent by a tag, leading to gaps in the RSSI values. These gaps in RSSI values can cause errors and inaccuracies in determining a location for a tag.

The techniques disclosed herein may be included in a practical application that provides technical advantages over existing systems. For example, according to techniques disclosed herein, a multichannel receiving unit of a wireless device such as a wireless AP can simultaneously and continuously listen on all three of the channels typically used by BLE tags to advertise their presence, e.g., channels 37, 38 and 39 of the BLE frequency band. Because the APs can listen to multiple channels simultaneously, APs using the techniques disclosed herein can receive more advertising signals from tags with fewer missed signals. As a result, a better average RSSI can be computed, resulting in improved location determination when compared with existing systems. The improved average RSSI values produced using the techniques disclosed herein can result in improved accuracy in determining location of tags when compared to existing systems that listen on one advertising channel or iteratively scan advertising channels.

Additionally, APs using the techniques disclosed herein can improve discovery of tags when compared with existing systems. There may be thousands of tags at a site. This can be a challenging radio frequency (RF) environment for discovery of tags. Using the techniques disclosed herein, an AP or other wireless device can scan and discover tags two to three times faster when compared with existing systems. Further, there is a greater probability of successfully detecting a tag in such a challenging RF environment.

In one example, the disclosure describes a device that includes one or more antennas; a plurality of Bluetooth Low Energy (BLE) transceivers, wherein a first BLE transceiver of the plurality of BLE transceivers is configured to receive a first BLE advertising signal on a first channel of a BLE frequency band, a second BLE transceiver of the plurality of BLE transceivers is configured to receive a second BLE advertising signal on a second channel of the BLE frequency band different from the first channel, and wherein a third BLE transceiver of the plurality of BLE transceivers is configured to receive a third BLE advertising signal on a third BLE channel of the BLE frequency band different from the first BLE channel and the second BLE channel, wherein the first BLE transceiver, the second BLE transceiver, and the third BLE transceiver currently listen for the first BLE advertising signal, the second advertising signal, and the third advertising signal; and processing logic communicatively coupled to the plurality of BLE transceivers, the processing logic configured to: determine data indicative of a distance from the device to a tag that is a source of one of more of the first BLE advertising signal, the second BLE advertising signal, and the third BLE advertising signal, and provide the data indicative of the distance to one of a location server or an asset management system.

In another example, the disclosure describes an access point that includes a memory, one or more processors; one or more antennas; one or more wireless interfaces to communicatively couple the access point to one or more wireless client devices; a wired interface to communicatively couple the access point to a wired network; a plurality of Bluetooth Low Energy (BLE) transceivers, wherein a first BLE transceiver of the plurality of BLE transceivers is configured to receive a first BLE advertising signal on a first channel of a BLE frequency band, a second BLE transceiver of the plurality of BLE transceivers is configured to receive a second BLE advertising signal on a second channel of the BLE frequency band different from the first channel, and wherein a third BLE transceiver of the plurality of BLE transceivers is configured to receive a third BLE advertising signal on a third BLE channel of the BLE frequency band different from the first BLE channel and the second BLE channel, wherein the first BLE transceiver, the second BLE transceiver, and the third BLE transceiver currently listen for the first BLE advertising signal, the second advertising signal, and the third advertising signal; and processing logic communicatively coupled to the plurality of BLE transceivers, the processing logic configured to determine data indicative of a distance from the device to a tag that is a source of one of more of the first BLE advertising signal, the second BLE advertising signal, and the third BLE advertising signal, wherein the memory stores instructions that, when executed, cause the one or more processors to obtain the data indicative of the distance and to provide the data indicative of the distance to a location server or an asset management system.

In a further example, the disclosure describes a method that includes configuring, by one or more processors, a first BLE transceiver of a plurality of BLE transceivers to listen for signals on a first BLE channel; configuring, by the one or more processors, a second BLE transceiver of the plurality of BLE transceivers to listen for signals on a first BLE channel to listen for signals a second BLE channel; configuring, by the one or more processors, a third BLE transceiver of the plurality of BLE transceivers to listen for signals on a first BLE channel to listen for signals on a third BLE channel; concurrently listening, by the first BLE transceiver, the second BLE transceiver, and the third BLE transceiver, for one or more BLE advertising signals associated with corresponding one or more tags; determining data indicative of a distance from a device including the first BLE transceiver, the second BLE transceiver, and the third BLE transceiver to a tag that is a source of one of more of the first BLE advertising signal, the second BLE advertising signal, and the third BLE advertising signal; providing the data indicative of the distance to a location server or an asset management system.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF THE DRAWINGS

The examples herein may be better understood by referring to the following description in conjunction with the accompanying drawings in which like reference numerals indicate identically or functionally similar elements, of which.

DETAILED DESCRIPTION

Figure 1:
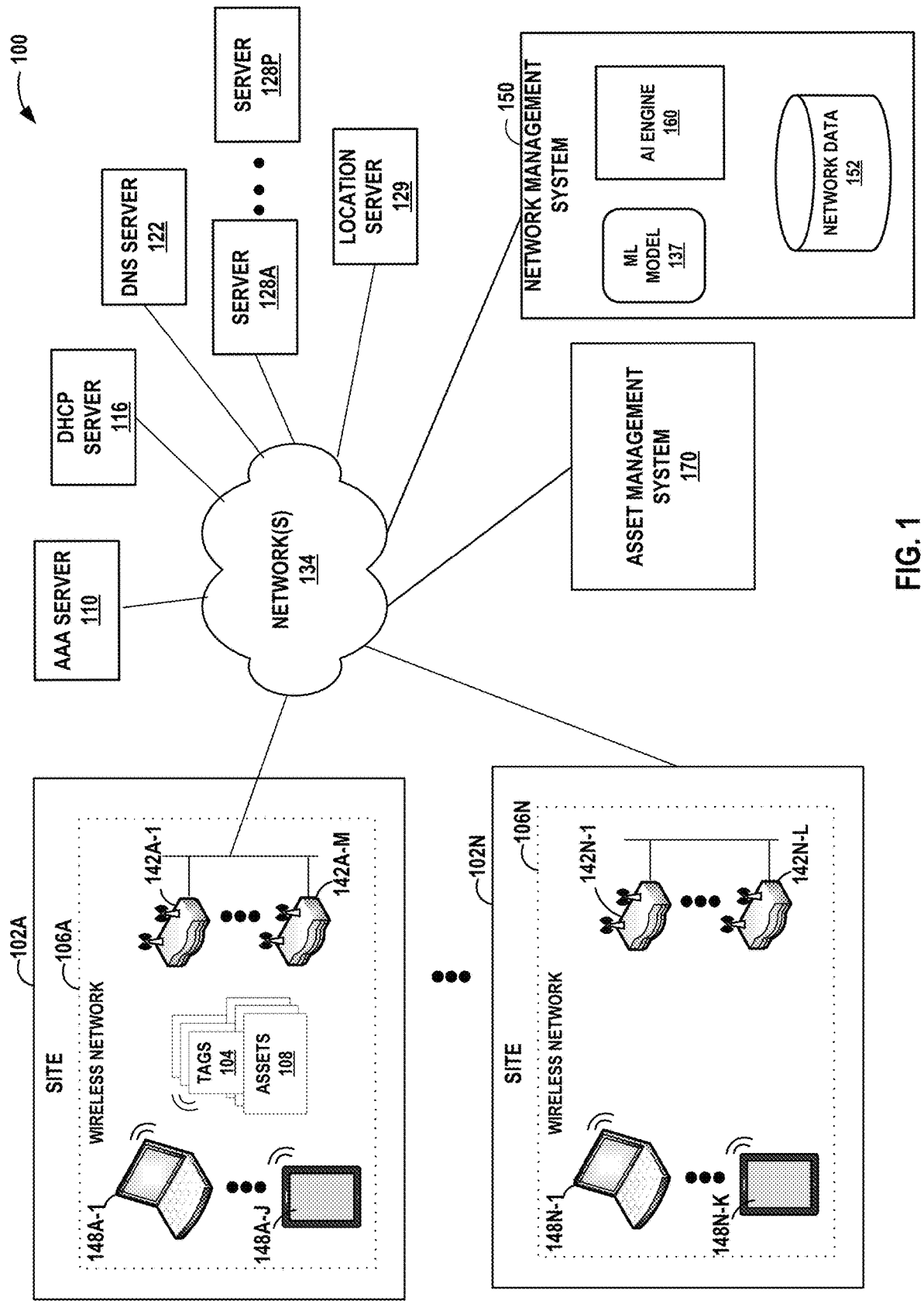
FIG. 1 is a diagram of an example network system in which BLE advertising signals are received and processed in accordance with one or more techniques of the disclosure.

FIG. 1 is a diagram of an example network system in which BLE advertising signals are received and processed in accordance with one or more techniques of the disclosure. Example network system 100 includes a plurality sites 102A-102N at which a network service provider manages one or more wireless networks 106A-106N, respectively. Although in FIG. 1 each site 102A-102N is shown as including a single wireless network 106A-106N, respectively, in some examples, each site 102A-102N may include multiple wireless networks, and the disclosure is not limited in this respect.

Each site 102A-102N includes a plurality of access points (APs), referred to generally as APs 142. For example, site 102A includes a plurality of APs 142A-1 through 142A-M. Similarly, site 102N includes a plurality of APs 142N-1 through 142N-L. Each AP 142 may be any type of wireless access point, including, but not limited to, a commercial or enterprise AP, a router, or any other device capable of providing wireless network access.

Each site 102A-102N also includes a plurality of client devices (also referred to as otherwise known as user equipment devices (UEs)), referred to generally as client devices 148, representing various wireless-enabled devices within each site. For example, a plurality of client devices 148A-1 through 148A-J are currently located at site 102A. Similarly, a plurality of client devices 148N-1 through 148N-K are currently located at site 102N. Each client device 148 may be any type of wireless client device, including, but not limited to, a mobile device such as a smart phone, tablet or laptop computer, a personal digital assistant (PDA), a wireless terminal, a smart watch, smart ring or other wearable device. Client devices 148 may also include IoT client devices such as printers, security devices, environmental sensors, or any other device configured to communicate over one or more wireless networks.

Example network system 100 also includes various networking components for providing networking services within the wired network including, as examples, an Authentication, Authorization and Accounting (AAA) server 110 for authenticating users and/or client devices 148, a Dynamic Host Configuration Protocol (DHCP) server 116 for dynamically assigning network addresses (e.g., IP addresses) to client devices 148 upon authentication, a Domain Name System (DNS) server 122 for resolving domain names into network addresses, a plurality of servers 128 (e.g., web servers, databases servers, file servers and the like), a network management system (NMS) 150, and an asset management system 170.

Network system 100 may also include a location server 129. Location server 129 may maintain location data regarding the locations of network devices at enterprise sites 102. The location data can include the locations of APs 142. Location server 129 can determine a location by various methods. In some aspects, the location data for APs 142 may be configured, for example, by a network administrator. In some aspects, the location data for APs 142 may be learned, for example, by triangulation based on signal strengths of the APs 142. Example techniques for determining one or more locations of APs 142 and client devices 148 are described in U.S. Provisional Patent Application Ser. No. 63/125,595, entitled "DETERMINING LOCATION BASED ON DYNAMIC PATH LOSS EXPONENT (PLE) AND INTERCEPT (INT) ESTIMATION," filed Dec. 15, 2020, and U.S. Provisional Patent Application Ser. No. 63/243,616, entitled "DETERMINING LOCATIONS OF DEPLOYED ACCESS POINTS," filed Sep. 13, 2021, the entire contents of each of which is hereby incorporated by reference. The techniques described herein are not limited to any particular technique for deriving a location of APs or client devices.

As shown in FIG. 1, the various devices and systems of network 100 are coupled together via one or more network(s) 134, e.g., the Internet and/or an enterprise intranet. Each one of the servers 110, 116, 122, 128, and/or 129, APs 142, client devices 148, NMS 150, and any other servers or devices attached to or forming part of network system 100 may include a system log or an error log module wherein each one of these devices records the status of the device including normal operational status and error conditions.

In the example of FIG. 1, NMS 150 is a cloud-based computing platform that manages wireless networks 106A-106N at one or more of sites 102A-102N. NMS 150 can provide an integrated suite of management tools and implements various techniques of the disclosure. For example, NMS 150 can monitor network data, including network performance data and roaming data, associated with wireless networks 106A-106N at each site 102A-102N, respectively. NMS 150 can manage network resources, such as APs 142 at each site, to deliver a high-quality wireless experience to end users, IoT devices and clients at the site. The network data may be stored in a database associated with NMS 150, such as database 152. In general, NMS 150 may provide a cloud-based platform for network data acquisition, monitoring, activity logging, reporting, predictive analytics, network anomaly identification, invoking remedial actions, and alert generation.

For example, NMS 150 may include an AI engine 160 that utilizes machine learning model 137 to analyze network data 152 received from one or more client devices 148 and/or one or more APs 142 in a wireless network, provides real-time insights and simplified troubleshooting for IT operations, and automatically takes corrective action or provides recommendations to proactively address wireless network issues.

In the example shown in FIG. 1, site 102A includes assets 108. Assets 108 may be various types of assets including fixed assets and mobile assets. An asset may be merchandise in a store or warehouse, information technology (IT) assets such as network infrastructure (switches, routers etc.), computers (laptops, tablet computers, desktop computers etc.), or other physical objects. Each of assets 108 has an associated tag 104 that advertises the presence of the tag 104 associated with its corresponding asset. As an example, the tag 104 can be used to track the location and movement of its associated asset 108 within or near site 102A. APs 142A-1-142A-M may be configured to use the techniques described herein to receive advertisements from tags 104 and to use the advertisements to determine, or provide information used to determine, the locations of assets 108. In some aspects, the advertisements may comply with a BLE "ADV_NONCONN_IND" format, which is one of several possible BLE frame formats used for (unconnected) beacon advertising.

Asset management system (AMS) 170 can receive, create, and/or store information regarding assets 108. As an example, AMS 170 may store an identifier, description, and location of an asset. AMS 170 may receive location information from APs 142 regarding tags 104. In some aspects, AMS 170 may receive distance information from an AP that indicates a distance from the AP to a tag for which the AP has received an advertisement. AMS 170 may use the distance to the tag, along with distances to the tag received from other APs to determine a location of the tag. In some aspects, the location may be relative to the APs. In some aspects, the location may be fixed location based on information received from the APs and from location server 129. For example, AMS 170 may obtain fixed location for APs 142 from location server 129, and use distance information to a tag received from one or more APs 142 to determine a fixed location for the tag (and thus the asset associated with the tag).

Figure 2:
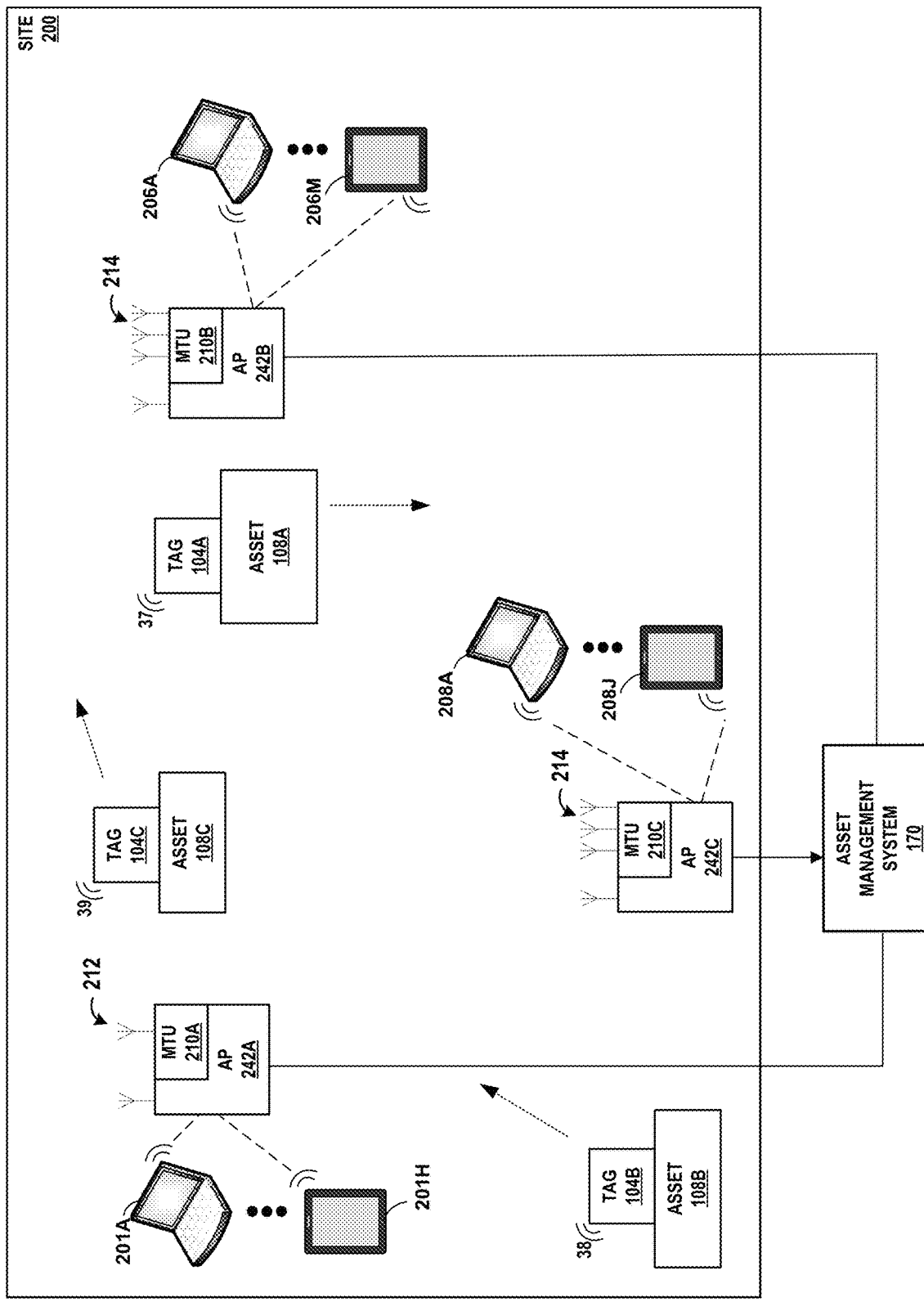
FIG. 2 is a block diagram illustrating further details of a site of the example network system of FIG. 1.

FIG. 2 is a block diagram illustrating further details of a site of the example network system of FIG. 1. In the example shown in FIG. 2, site 200 includes APs 242A-242C (collectively "APs 242"), client devices 201A-201H associated with AP 242A, client devices 206A-206M associated with AP 242B and client devices 208A-208J associated with AP 242C. As an example, site 200 may be one of sites 102 of FIG. 1. APs 242. APs 242 may be implementations of APs 148 of FIG. 1. Client devices 201A-201H, 206A-206M, and 208A-208J may be implementations of client devices 148 of FIG. 1. APs 242 may be communicatively coupled to AMS 170.

In the example shown in FIG. 2, within site 200 are assets 108A-108C, each having a corresponding tag 104A-104C respectively. In this example, tag 104A advertises its presence via BLE channel 37, tag 104B advertises its presence via BLE channel 38, and tag 104C advertises its presence via BLE channel 39. Other assets and tags may be present and are not shown in FIG. 2 to avoid obfuscating the description. Other tags may advertise their presence on one or more of BLE channels 37, 38, and/or 39.

Figure 3:
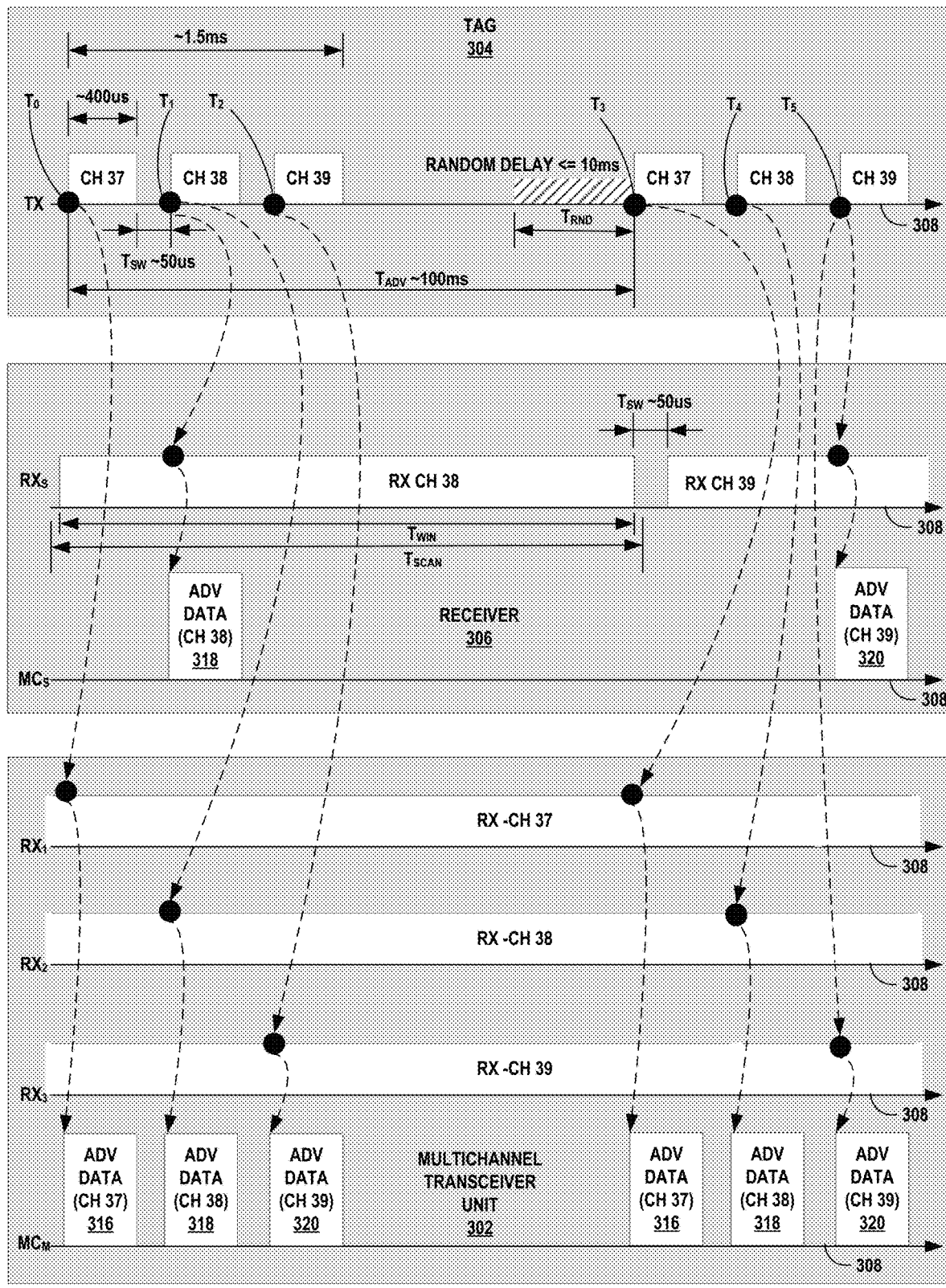
FIG. 3 is a block diagram illustrating example BLE advertising signal transmission and reception timing, in accordance with one or more techniques of the disclosure.

Each of APs 242A-C can have a corresponding multichannel unit (MCU) 210A-C that receives advertising signals sent from tags such as tags 104. MCUs may have varying numbers of antennas. As shown in FIG. 2, MCU 210A has a single antenna 212. MCUs 210B and 210C have multiple antennas 214. An MCU 210 can use the techniques described in further detail below to concurrently receive advertising signals sent via multiple BLE channels (e.g., channels 37-39). Further details on APs 242 and MCUs 210 are provided below with respect to FIGS. 4A-4F FIG. 3 is a block diagram illustrating example BLE advertising signal transmission and reception timing, in accordance with one or more techniques of the disclosure. The example shown in FIG. 3 illustrates aspects of an example signal transmission of tag 304, example signal listening and processing of a receiver 306 used in existing systems, and example signal listening and processing of multichannel transceiver 302 that implements the techniques disclosed herein. The signal transmission, listening, and processing are shown as occurring along a common timeline 308 (not to scale). Tag 304 may be an implementation of tag 104 of FIGS. 1 and 2. Multichannel transceiver 302 may be an implementation of multichannel transceiver unit 210 of FIG. 2.

In the example shown in FIG. 3, tag 304 sequentially transmits advertising signals over channels 37, 38 and 39 during an advertisement time window $t_{adv}$ having a duration of approximately 100 ms. In this example, tag 304 transmits an advertising signal for approximately 400 us. At time to, tag 304 transmits an advertising signal over channel 37. Tag 304 then performs operations to switch to transmission of an advertising signal over channel 38 at time $t_1$. The time required for tag 304 to switch to a new channel is approximately 50 us in this example. Tag 304 then switches to channel 39, and transmits an advertising signal over channel 39 at time $t_2$. After the expiration of the advertisement time window, tag 304 repeats transmission of the advertising signal over channels 37, 38 and 39 at times $t_3$, $t_4$ and $t_5$ respectively. In some aspects, the advertisement time window is made to vary by introducing a random delay $t_{md}$ of less than 10 ms prior to the start of the next advertisement window.

In the example of FIG. 3, receiver 306 iteratively and sequentially listens for advertising signals over channels 37, 38, and 39. Receiver 306 listens during a scan interval $t_{scan}$ that, for optimal detection of advertising signals in a single receiver environment, should be slightly longer (e.g., 10 ms) than $t_{adv}$. Receiver 306 listens for a time twin that is approximately equal to $t_{scan}$. At time to, receiver 306 is listening on channel 38 for advertising signals. Receiver 306 thus receives the advertising signal transmitted on channel 38 at time $t_1$. Because it is listening on channel 38, receiver 306 does not receive the signal transmitted over channel 37 at time to and the signal transmitted over channel 39 at time $t_2$. After listening on channel 38 for time twin, receiver 306 switches to channel 39 to listen for advertising signals. Receiver 306 thus receives the advertising signal transmitted by tag 304 at time $t_5$. However, because it is listening on channel 39, receiver 306 does not receive the signal transmitted on channel 37 at time $t_3$ and the signal transmitted on channel 38 at time $t_4$.

A microcontroller of receiver 306 processes the advertising signal received over channel 38 at time $t_1$ to obtain advertising data 318. Similarly, the microcontroller processes the advertising signal received at time $t_5$ on channel 39 to obtain advertising data 320.

Multichannel transceiver 302 is implements techniques disclosed herein to concurrently listen on channels 37, 38 and 39. For example, multichannel transceiver 302 is configured with at least three individual transceivers, each configured to listen to a corresponding channel. Thus, a first transceiver of multichannel transceiver 302 is configured to listen on channel 37, a second transceiver of multichannel transceiver 302 is configured to listen on channel 38, and a third transceiver of multichannel transceiver 302 is configured to listen on channel 39. Because multichannel transceiver 302 is concurrently listening on channels 37, 38 and 39, multichannel transceiver 302 receives all six signals transmitted at times $t_0$-$t_5$. Thus, a microcontroller of multichannel transceiver 302 can process the received signals to obtain two instances of each of advertising data 316-318.

The example of FIG. 3 illustrates several technical problems with existing BLE advertising receivers. As shown in the example, existing receivers may receive only one third of the signals transmitted by a tag, resulting in a waste of two thirds of the advertising signals produced by the tag. This can lead to gaps in information derived from the advertising signal or less accurate estimations derived from the advertising signal. For example, distance information is typically computed as an average based on multiple signal strength measurements of received advertising signals. This average more likely to be inaccurate if there are gaps in the information used to determine the average, or if the average is based on fewer measurements.

The techniques described herein can be implemented in a practical application (e.g., an access point) that provides advantages over existing systems. For example, the multichannel transceiver described herein can concurrently receive advertising signals transmitted over channels 37, 38 and 39. As a result, the multichannel transceiver described herein can obtain more samples of signal strengths, resulting in more accurate distance estimation when compared with existing system. Further, tag transmissions are not wasted.

Additionally, APs using the techniques disclosed herein can improve discovery of tags when compared with existing systems. Using the example shown in FIG. 3, multichannel transceiver 302 discovers the existence of tag 304 using channel 37 at time to before receiver 304 discovers tag 304 at time $t_1$. There may be thousands of tags at a site. This can be a challenging radio frequency (RF) environment for discovery of tags. Using the techniques disclosed herein, an AP or other wireless device can scan and discover tags two to three times faster when compared with existing systems. Further, there is a greater probability of successfully detecting a tag in such a challenging RF environment.

A further advantage is that because the techniques disclosed herein are better able to detect tags, the tags may use a lower power to transmit advertisements, thereby increasing the battery life of the tags.

Figure 4A:
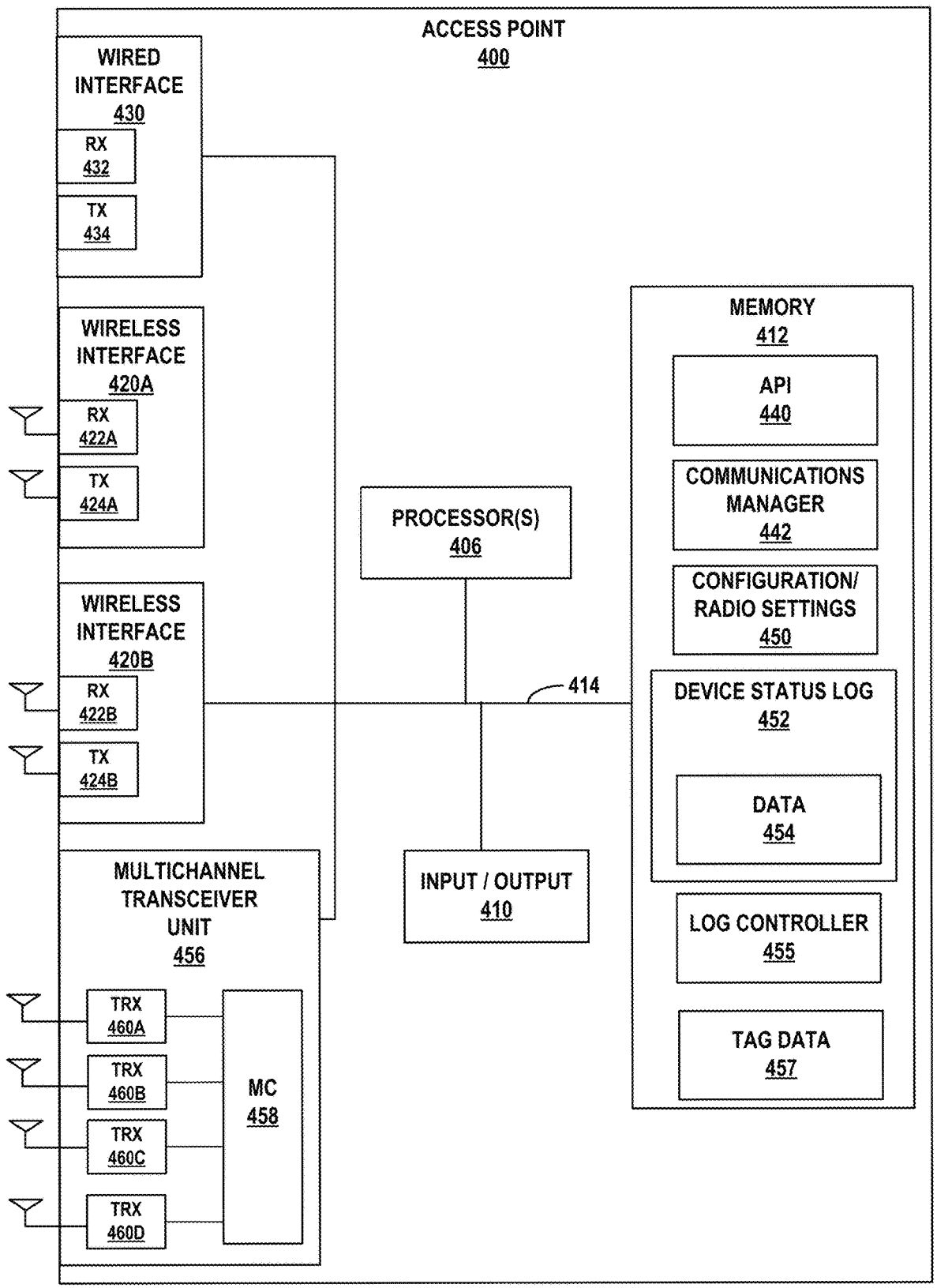
FIG. 4A is a block diagram of an example access point in accordance with one or more techniques of the disclosure.

FIG. 4A is a block diagram of an example access point in accordance with one or more techniques of the disclosure. Example access point 400 shown in FIG. 4A may be used to implement any of AP devices 142 and/or AP devices 242 as shown and described herein with respect to FIGS. 1 and 2. Access point device 200 may comprise, for example, a Wi-Fi, Bluetooth and/or Bluetooth Low Energy (BLE) base station or any other type of wireless access point.

In the example of FIG. 4, access point device 400 includes a wired interface 430, wireless interfaces 420A-220B, multichannel transceiver unit 456, one or more processor(s) 406, memory 412, and input/output 410, coupled together via a bus 414 over which the various elements may exchange data and information. Wired interface 430 represents a physical network interface and includes a receiver 432 and a transmitter 434 for sending and receiving network communications, e.g., packets. Wired interface 430 couples, either directly or indirectly, access point device 400 to network(s) 134 of FIG. 1A.

First and second wireless interfaces 420A and 420B represent wireless network interfaces and include receivers 422A and 422B, respectively, each including a receive antenna via which access point 400 may receive wireless signals from wireless communications devices, such as client devices 148 of FIG. 1A. First and second wireless interfaces 420A and 420B further include transmitters 424A and 424B, respectively, each including transmit antennas via which access point 400 may transmit wireless signals to wireless communications devices, such as client devices 148 of FIG. 1A. In some examples, first wireless interface 420A may include a Wi-Fi 802.11 interface (e.g., 2.4 GHz and/or 5 GHZ) and second wireless interface 420B may include a Bluetooth interface and/or a Bluetooth Low Energy (BLE) interface. However, these are given for example purposes only, and the disclosure is not limited in this respect.

In some aspects, multichannel transceiver unit 456 includes microcontroller 458 and transceivers 460A-460D (collectively, "transceivers 460"). In the example shown in FIG. 4A, multichannel transceiver unit 456 includes four transceivers. However, multichannel transceiver interface 456 may include as few as three transceivers and may include more than four transceivers. In some aspects, three transceivers are dedicated to a particular communications channel, and other transceivers can be used for communications over other channels. For example, one transceiver can be dedicated for each of channels 37, 38 and 39 while a fourth transceiver can be used for communications over other channels. The example shown in FIG. 4A shows that each transceiver 460 is communicatively coupled with its own respective antenna. In some aspects, transceivers 460 can be BLE transceivers. In some aspects, transceivers 460 can support other than BLE, such as classical Bluetooth, an ANT protocol or ANT+protocol as designed and marketed by ANT Wireless (a division of Garmin Canada) or a Z-Wave protocol as specified by the Z-Wave Alliance.

Additionally, transceivers 460 may support different transmission rates. For example, BLE supports transmission rates of one Mbps and two Mbps. Proprietary extensions of BLE developed by Nordic Semiconductor support non-standard transmission rates of 126 kbps, 500 kbps and use the same central frequencies specified for the BLE standard. In some aspects, transceivers 460 may operate at the same transmission rate. In some aspects, some of transceivers 460 may operate at a first transmission rate, while others concurrently operate at different transmission rates.

Microcontroller 458 controls the operation of multichannel transceiver unit 456. For example, microcontroller 458 can configure transceivers 460 for listening on channels 37, 38 and 39 for advertising signals from tags 104, 304 (FIGS. 1, 2 and 3). Further, microcontroller 458 can provide an interface for AP 400 to send and receive data via transceivers 460. In some aspects, microcontroller 458 may determine signal strength values (e.g., RSSI values) with respect to tag advertising signals received by one or more of transceivers 460. Microcontroller 458 can store the signal strength values and an identifier associated with the corresponding tag in tag data 457. AP 400 can periodically or on demand provide the signal strength values and identifiers to asset management system 170 (FIGS. 1 and 2), which can use the signal strength values received from AP 400 and other APs at a site 102 to determine locations of the assets corresponding to the tags. Further details and alternative implementations of multichannel transceiver unit 456 are provided below with respect to FIGS. 4B-4E.

Processor(s) 406 are programmable hardware-based processors configured to execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform one or more of the techniques described herein.

Memory 412 includes one or more devices configured to store programming modules and/or data associated with operation of access point device 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform one or more of the techniques described herein.

In this example, memory 412 stores executable software including an application programming interface (API) 440, a communications manager 442, configuration settings 450, a device status log 452, data storage 454 and tag data 457. Device status log 452 includes network data, e.g., a list of network parameters and/or network events, specific to AP device 400, tags, and/or client devices currently or previously associated with AP device 400. The network data may include, for example, any network parameter and/or network data indicative of one or more aspects of performance of the wireless network or of the AP device 400 itself. In some examples, the network data may include a plurality of states measured periodically as time series data. The network data may be measured by the client device devices 148 and transmitted to AP device 400, may be measured by AP device 400 itself or by any other device associated with the wireless network and transmitted to AP device 400.

Network data stored in data storage 454 may include, for example, AP events and/or client device events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, one or more types of proximity events, etc., as well as a time and date stamp for each event. Log controller 455 determines a logging level for the device based on instructions from NMS 130. Data 454 may store any data used and/or generated by access point device 400, including data collected from client devices 148.

Communications manager 442 includes program code that, when executed by processor(s) 406, allow access point 400 to communicate with client devices 148 and/or network(s) 134 via any of interface(s) 430 and/or 420A-420B. Configuration settings 450 include any device settings for access point 400 such as radio settings for each of wireless interface(s) 420A-420B. These settings may be configured manually or may be remotely monitored and/or automatically managed or configured by NMS 130 to optimize wireless network performance on a periodic (e.g., hourly or daily) basis.

Input/output (I/O) 410 represents physical hardware components that enable interaction with a user, such as buttons, a touchscreen, a display and the like.

Although not shown, memory 412 typically stores executable software for controlling a user interface with respect to input received via I/O 410.

In the example shown in FIG. 4A, multichannel transceiver unit 456 is shown as being integrated with access point 400. In some aspects, multichannel transceiver unit 456 may be an independent device that is capable of performing the techniques described herein. In such aspects, multichannel transceiver unit 456 may include its own wired interface (not shown) for communicating with asset management server 170 and/or location server 129.

Figure 4B:
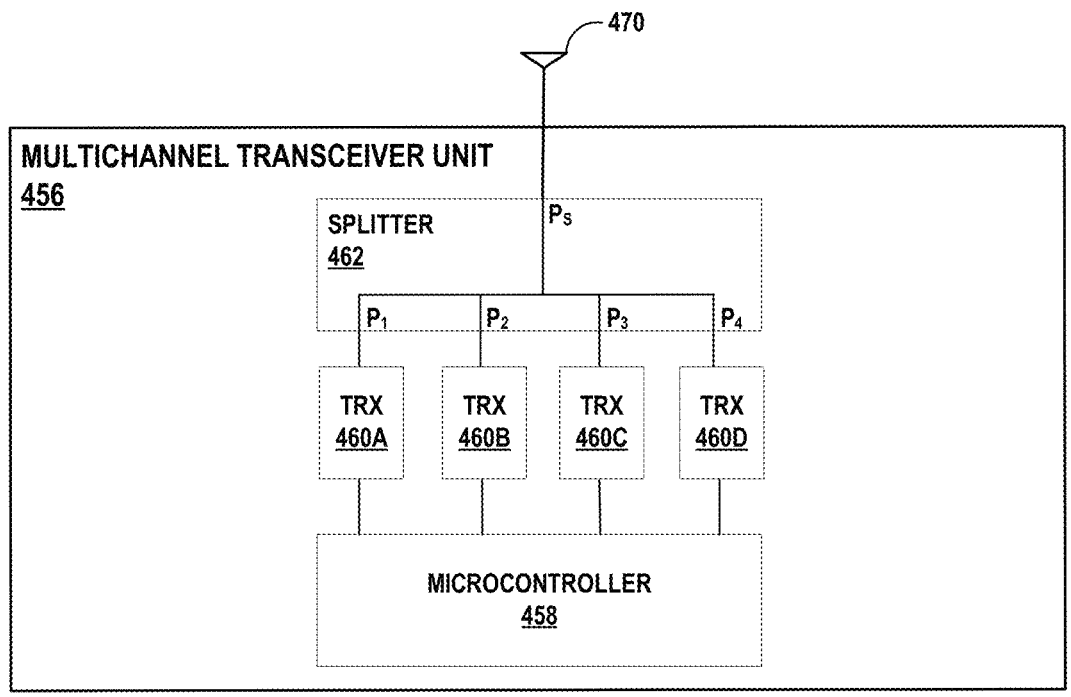
FIGS. 4B-4E are block diagrams illustrating example multi-channel transceiver units of the access point of FIG. 4A, according to one or more techniques of the disclosure.

FIGS. 4B-4E are block diagrams illustrating example implementations of multi-channel transceiver 456, according to one or more techniques of the disclosure. In the example shown in FIG. 4A, each transceiver 460 is communicatively coupled to its own antenna. FIG. 4B illustrates an example implementation where the transceivers 460 share a single antenna, according to aspects of the disclosure. In this example, a splitter 462 receives signals via an omnidirectional antenna 470 at a port $p_s$. Splitter 462 may be a "splitter/combiner" that is a bidirectional device. In such cases, splitter 462 splits a signal received from antenna 470, and combines signals received from transceivers 460 for transmission via antenna 470. Generally speaking, splitter 462 is a passive device with respect to power. Thus, if $p_s$ is used as an input, the power is divided among $p_1, p_2, \ldots p_n$ (typically in equal measure). Conversely, if power is applied to ports $p_1, p_2, \ldots p_n$, a signal at $p_s$ represents a sum of input signals. Splitter 462 in this example has four ports, $p_1$-$p_4$. Splitter 462 replicates the signal received via antenna 470 to each port such that each transceiver 460 receives a copy of the same signal. Transceivers 460 listen on their respective channels for the presence of an advertising signal. FIG. 4B shows an example having four ports, other implementations may have greater than or less than four ports. For example, splitters having eight, sixteen or other numbers of ports are possible.

Figure 4C:
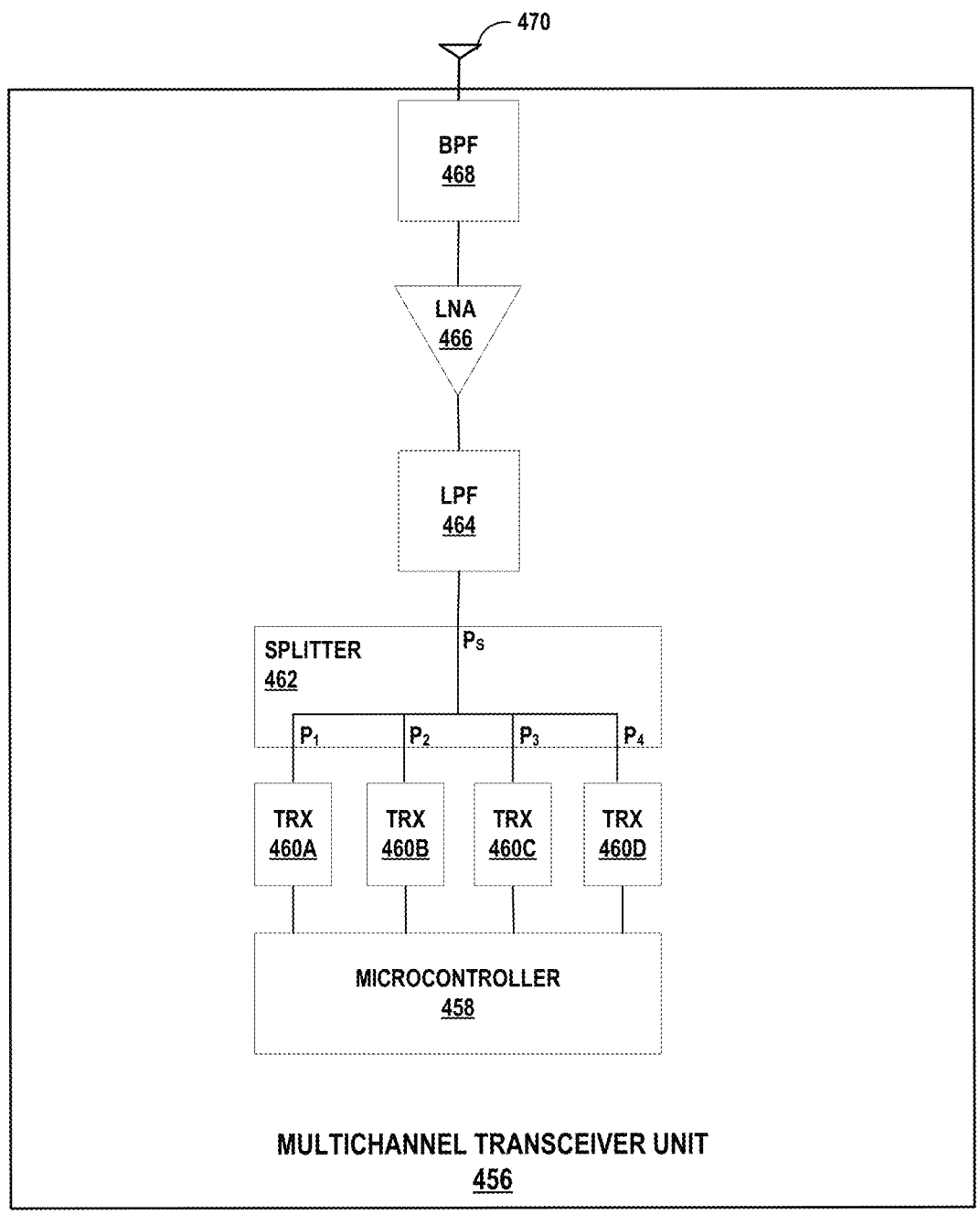

FIG. 4C shows an example implementation of multichannel transceiver unit 456 that filters and amplifies a signal received via antenna 470, according to aspects of the disclosure. The use of a splitter to replicate a signal across multiple ports can result in the signal that appears at each port $p_n$ having less strength than the signal received at the source port $p_s$. For example, a four port splitter can exhibit a -6 dB gain at each port $p_0$-$p_3$. An eight port splitter can exhibit a 9 db gain at each port $p_0$-$p_7$. Generally, for a splitter having $2^n$ ports, there will be a -3*n dB gain in the signal at each port compared to the source port $p_s$. To compensate for this loss in signal strength, some implementations of multiport transceiver unit 456 include a low-noise amplifier 466 between antenna 470 and splitter 462. In some aspects, low-noise amplifier 466 may have a noise factor of 2-3 dB, and a 15 dB gain, however other values for the noise factor and gain are possible. Additionally, some implementations can optionally include band pass filter 468 to filter out signals outside of the desired band prior to input at low-noise amplifier 466. For example, band pass filter 468 may filter out signals outside of the BLE assigned frequency range. Further, some implementations may optionally include low pass filter 464 between low-noise amplifier 466 and splitter 462 to filter out signals above the desired frequency band (e.g., the BLE frequency band). Band pass filter 468 and low pass filter 464 may each have an approximately-1 dB gain. Low-noise amplifier 466 can be designed to compensate for the loss in signal strength introduced by band pass filter 468 and/or low pass filter 464, when present.

Figure 4D:
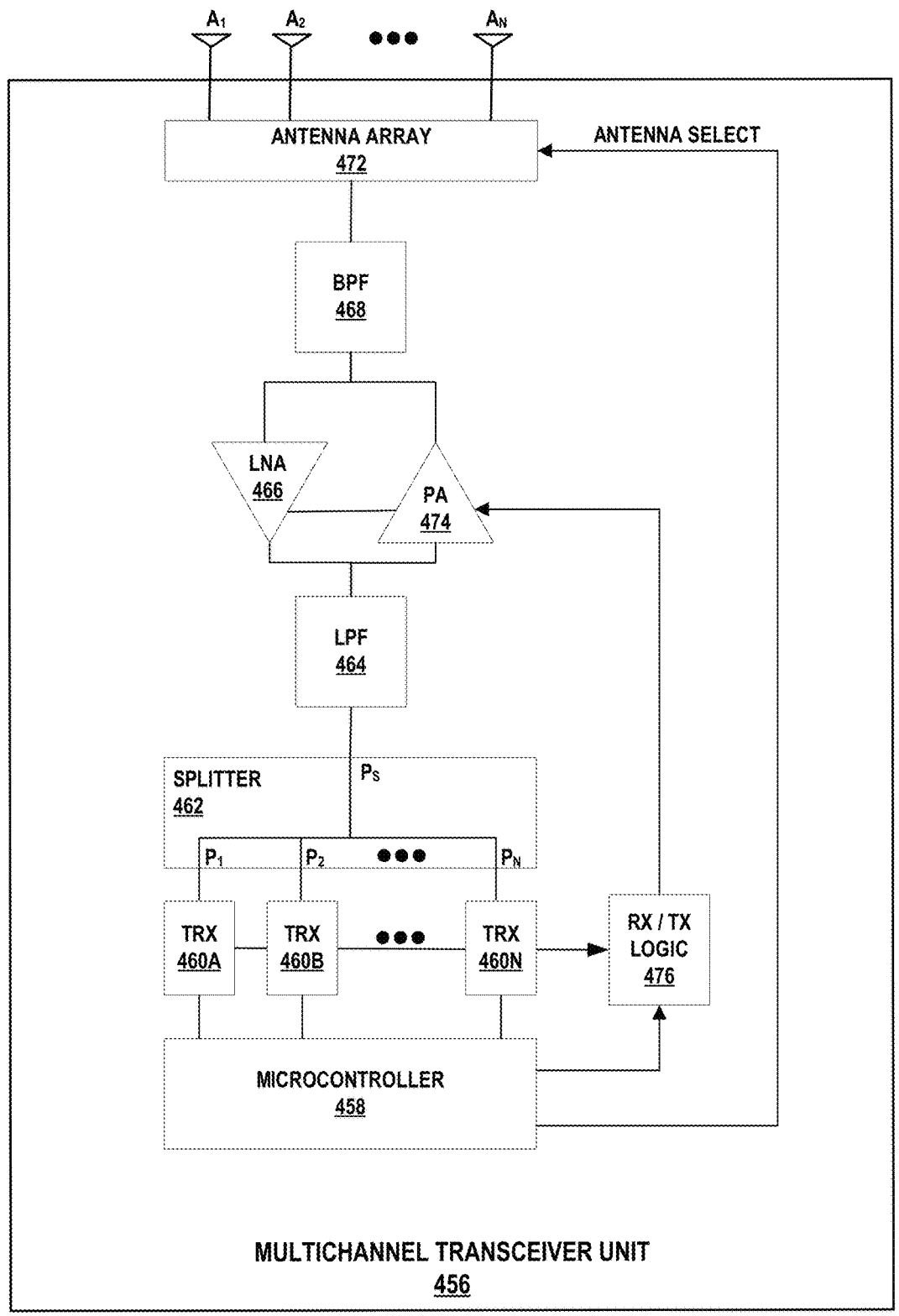

FIG. 4D shows an example implementation of multichannel transceiver unit 456 that transmits and receives signals via multiple antennas, according to aspects of the disclosure. In the example shown in FIG. 4D, multichannel transceiver unit 456 includes an antenna array 472 having n antennas $A_1$-$A_n$. In this example, there is one transceiver 460 for each antenna. Band pass filter 468 is optionally coupled to antenna array 472 to filter signals being transmitted or received. As in the example, of FIG. 4C, low-noise amplifier 466 amplifies signals that are input into low pass filter 464 and transceivers 460. Power amplifier 474 amplifies signals received from low pass filter 464 via splitter 462 and transceivers 460. In some implementations, power amplifier may provide a 20 dB signal gain. Receive/transmit logic 476 includes logic that controls which amplifier is to be used at a given time. For example, receive/transmit logic 476 may indicate that power amplifier 474 is to receive a signal from a transceiver 460, and low-noise amplifier 466 is bypassed during such transmission. At times other than when a signal is being transmitted, receive/transmit logic 476 may indicate that low-noise amplifier 466 is to amplify signals received from antenna array 472 and that power amplifier 474 is bypassed. Microcontroller 458 can supply an antenna select signal to antenna array 472 to indicate which of the antennas is to be used to transmit an outgoing signal.

As noted above, transceivers 460 may concurrently operate at different transmission rates. As shown in FIGS. 4B-4D, these transceivers may share the same antenna, splitter, LNA, bandpass filters and lowpass filters even when concurrently operating at different transmission rates.

Figure 4E:
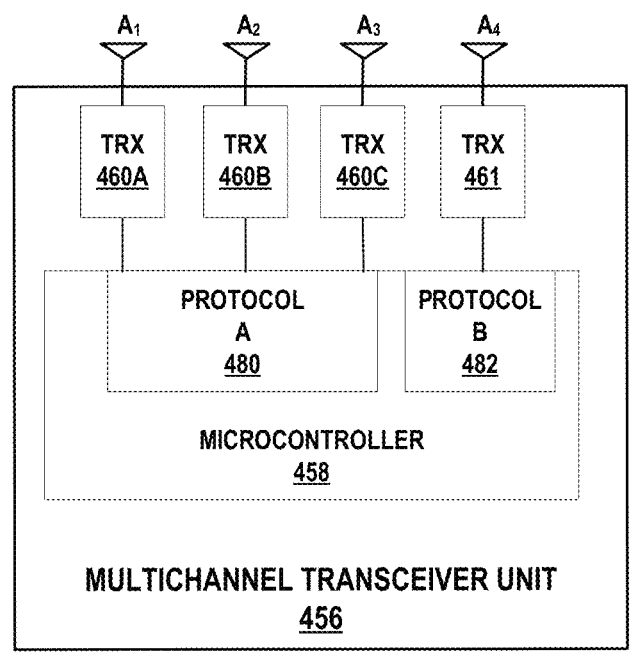

FIG. 4E shows an example implementation of multichannel transceiver unit 456 that supports multiple protocols and/or multiple transmission rates, according to aspects of the disclosure. In the example shown in FIG. 4E, transceivers 460A-460C are communicatively coupled to antennas $A_1$-$A_3$ respectively. Antenna A+ is communicatively coupled to transceiver 461. Transceivers 460 may be configured to support protocol A 480. Protocol 480 may be BLE, for example. Transceiver 461 may be configured to support protocol B 482, that can be different from protocol 480. As one example, protocol 482 may be the Zigbee protocol. As a further example, protocol 482 may be a Bluetooth (e.g., "classical" Bluetooth) protocol for a Bluetooth device such as an audio/video device. Further, protocol 482 may be an ANT protocol or ANT+protocol as designed and marketed by ANT Wireless (a division of Garmin Canada). Still further, protocol 482 may be a Z-Wave protocol as specified by the Z-Wave Alliance. Various combinations of the above are also possible, with protocol 480 being one of BLE, classical Bluetooth, ANT, ANT+ or Z-Wave, and protocol 482 being a different protocol.

Features of the implementations shown in FIGS. 4A-4E may be combined with one another in various ways. As but one example, the multiprotocol transceiver unit of FIG. 4E may include an antenna array 472 of FIG. 4D, and may optionally include band pass filters, low pass filters, low-noise amplifiers and/or power amplifiers shown in FIGS. 4C-4D.

Figure 5:
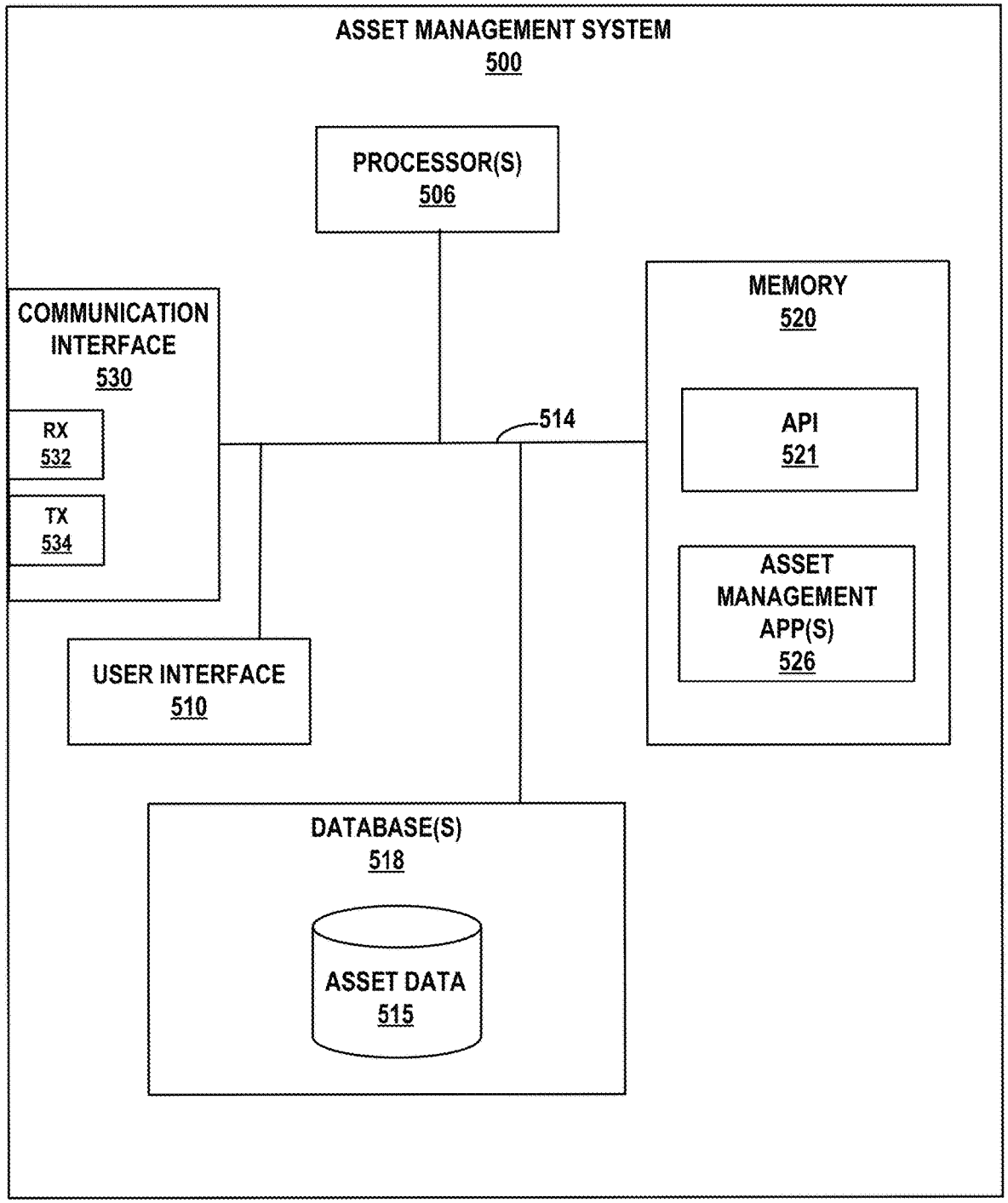
FIG. 5 is a block diagram of an example asset management system in accordance with one or more techniques of the disclosure.

FIG. 5 is a block diagram of an example asset management system in accordance with one or more techniques of the disclosure. AMS 500 may be used to implement, for example, AMS 170 in FIGS. 1 and 2. In such examples, AMS 500 is responsible for managing assets located at sites 102 of FIG. 1. As an example, AMS 500 may receive information regarding assets such as the type of asset, an identifier of the asset, and other information describing the asset. Additionally, AMS 500 may determine and store locations of the assets based in information obtained from APs 142 at a site 102.

AMS 500 includes a communications interface 530, one or more processor(s) 506, a user interface 510, a memory 520, and a database 518. The various elements are coupled together via a bus 514 over which the various elements may exchange data and information.

Processor(s) 506 execute software instructions, such as those used to define a software or computer program, stored to a computer-readable storage medium (such as memory 520), such as non-transitory computer-readable mediums including a storage device (e.g., a disk drive, or an optical drive) or a memory (such as Flash memory or RAM) or any other type of volatile or non-volatile memory, that stores instructions to cause the one or more processors 506 to perform the techniques described herein.

Communications interface 530 may include, for example, an Ethernet interface. Communications interface 530 couples AMS 500 to a network and/or the Internet, such as any of network(s) 134 as shown in FIG. 1, and/or any local area networks. Communications interface 530 includes a receiver 532 and a transmitter 534 by which AMS 500 receives/transmits data and information to/from any of AP devices 142, servers 110, 116, 122, 128 and/or any other devices or systems forming part of network 100 such as shown in FIG. 1. The data and information received by NMS 500 may include, for example, distance information indicating distances of tags from access points 142. AMS 500 can use such information, perhaps along with information obtained from location server 129, to determine locations of assets associated with tags. As an example, AMS 500 may receive information from three or more APs 142 indicating a distance of the AP to a tag associated with an asset. AMS 500 can use triangulation or other methods to determine a location based on the distance information.

Memory 520 includes one or more devices configured to store programming modules and/or data associated with operation of NMS 500. For example, memory 520 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 506 to perform the techniques described herein.

In this example, memory 520 includes an API 521 and asset management applications 526. API 521 provides an interface for obtaining distance information and location information from APs 148, multichannel transceivers 456, and/or location server 129. Such information may be stored in database 518 as asset data 515. Asset data 515 can include data about an asset, include an identifier of the asset, an identifier of a tag associated with the asset, descriptive data for the asset, and location data for the asset. Asset management application(s) 526 may be one or more applications that manage assets at sites 102. For example, asset management applications may create, read, update or delete asset records in asset data 515. Asset management applications may also generate reports regarding assets and generates user interfaces for output on user interface device 510. AMS 500 may also include any other programmed modules, software engines and/or interfaces configured for asset management.

Figure 6:
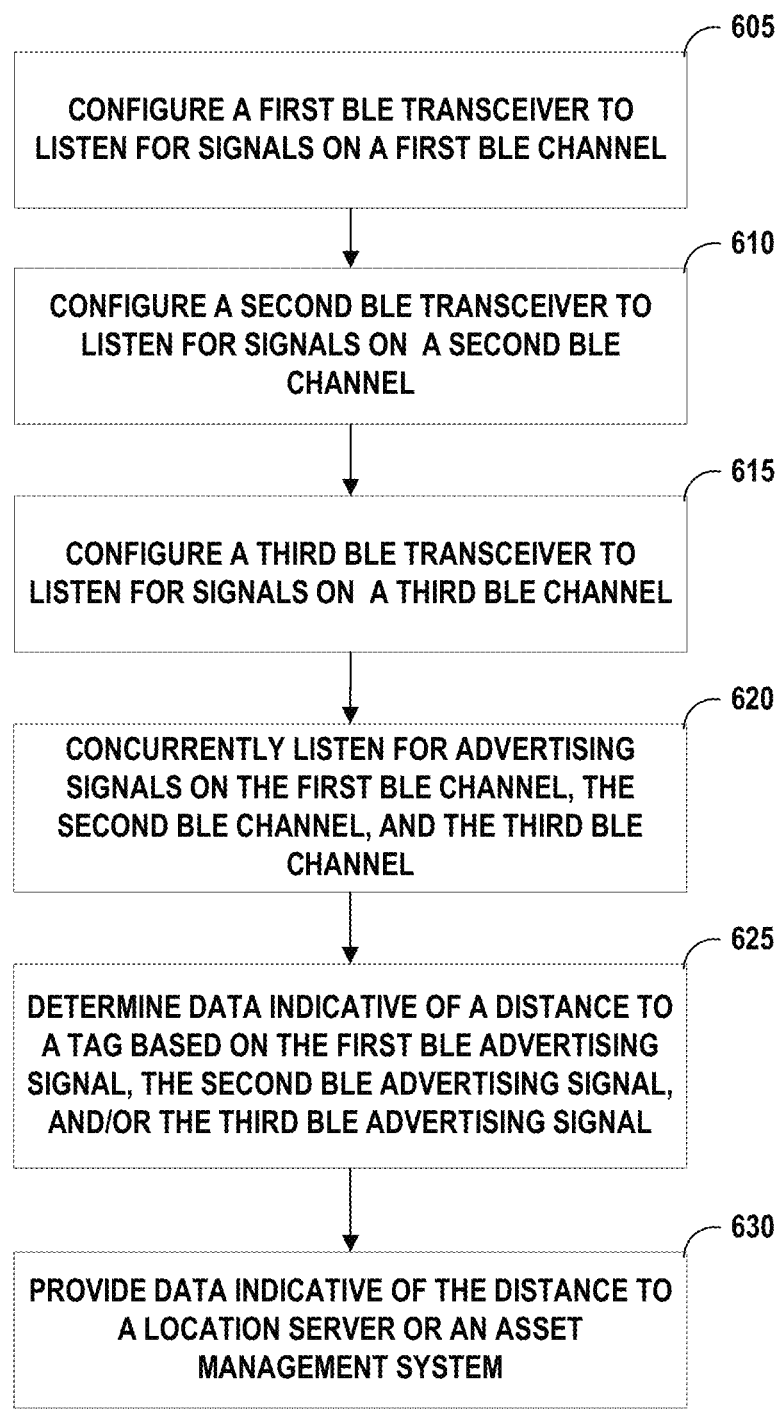
FIG. 6 is a flow diagram illustrating example operations of a multichannel transceiver unit, in accordance with one or more techniques of this disclosure.

FIG. 6 is a flow diagram illustrating example operations of a multichannel transceiver unit, in accordance with one or more techniques of this disclosure. A multichannel transceiver unit may configure a first BLE transceiver of a plurality of BLE transceivers to listen for signals on a first BLE channel (605). Next, a multichannel transceiver unit may configure a second BLE transceiver of the plurality of BLE transceivers to listen for signals on a second BLE channel (610). Next, a multichannel transceiver unit may configure a third BLE transceiver of the plurality of BLE transceivers to listen for signals on a third BLE channel (615). Next, a multichannel transceiver unit may concurrently listen, by the first BLE transceiver, the second BLE transceiver, and the third BLE transceiver, for one or more BLE advertising signals associated with corresponding one or more tags (620). Next, a multichannel transceiver unit may determine data indicative of a distance from a device including the first BLE transceiver, the second BLE transceiver, and the third BLE transceiver to a tag that is a source of one of more of the first BLE advertising signal, the second BLE advertising signal, and the third BLE advertising signal (625). Next, a multichannel transceiver unit may provide the data indicative of the distance to a location server or an asset management system (630).

Examples, as described herein, includes, or operates on, logic or a number of components, modules, or mechanisms. Modules are tangible entities (e.g., hardware) capable of performing specified operations and are configured or arranged in a certain manner. In an example, circuits are arranged (e.g., internally or with respect to external entities such as other circuits) in a specified manner as a module. In an example, the whole or part of one or more computer systems (e.g., a standalone, client or server computer system) or one or more hardware processors are configured by firmware or software (e.g., instructions, an application portion, or an application) as a module that operates to perform specified operations. In an example, the software resides on a machine readable medium. In an example, the software, when executed by the underlying hardware of the module, causes the hardware to perform the specified operations.

The techniques of various examples are implemented using software, hardware and/or a combination of software and hardware. Various examples are directed to apparatus, e.g., management entities, e.g., a network monitoring node, routers, gateways, switches, access points, DHCP servers, DNS servers, AAA servers, user equipment devices, e.g., wireless nodes such as mobile wireless terminals, base stations, communications networks, and communications systems. Various examples are also directed to methods, e.g., method of controlling and/or operating a communications device or devices, e.g., a network management node, an access point, wireless terminals (WT), user equipment (client devices), base stations, control nodes, DHCP nodes, DNS servers, AAA nodes, Mobility Management Entities (MMEs), networks, and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed are provided as example approaches. Based upon design preferences, it is understood that the specific order or hierarchy of steps in the processes are rearranged while remaining within the scope of the present disclosure. The accompanying method claims present elements of the various steps in a sample order, and are not meant to be limited to the specific order or hierarchy presented.

In various examples devices and nodes described herein are implemented using one or more modules to perform the steps corresponding to one or more methods, for example, signal generation, transmitting, processing, analyzing, and/or receiving steps. Thus, in some examples various features are implemented using modules. Such modules are implemented, in at least some examples, using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple or all of the operations of the disclosed examples.

In some examples, the processor or processors, e.g., CPUs, of one or more devices, e.g., communications devices such as routers, switches, network attached servers, network management nodes, wireless terminals (client devices), and/or access nodes, are configured to perform the steps of the methods described as being performed by the devices. The configuration of the processor is achieved, in at least some examples, by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules are implemented, in at least some examples, purely in hardware, e.g., as circuits, or implemented using software and/or hardware or a combination of software and hardware.

Some examples are directed to a computer program product comprising a computer-readable medium comprising code for causing a computer, or multiple computers, to implement various functions, steps, acts and/or operations, e.g., one or more steps described above. Depending on the example, the computer program product can, and sometimes does, include different code for each step to be performed. Thus, the computer program product includes, in at least some examples, code for each individual step of a method, e.g., a method of operating a communications device, e.g., a network management node, an access point, a base station, a wireless terminal or node. The code is in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above. Accordingly, some examples are directed to a processor, e.g., CPU, configured to implement some or all of the steps of the methods described herein. The processor is for use in, e.g., a communications device or other device described in the present application.

While described in the context of a communications system including wired, optical, cellular, Wi-Fi, Bluetooth and BLE, at least some of the methods and apparatus of various examples are applicable to a wide range of communications systems including IP and non IP based, OFDM and non-OFDM and/or non-cellular systems.

Numerous additional variations on the methods and apparatus of the various examples described above will be apparent to those skilled in the art in view of the above description. Such variations are to be considered within the scope. The methods and apparatus are used, in at least some examples, with IP based and non-IP, wired and wireless such CDMA, orthogonal frequency division multiplexing (OFDM), Wi-Fi, Bluetooth, BLE, optical and/or various other types of communications techniques which are used, in at least some examples, to provide communications links between network attached or associated devices or other devices including receiver/transmitter circuits and logic and/or routines, for implementing the methods.

Although the discussion above describes, in some instances, a multichannel transceiver having multiple BLE transceivers, the techniques disclosed herein apply as well to a multichannel receiver having multiple BLE receivers. Further, the techniques may be applied to multichannel transceivers and/or receivers configured to process signals according to protocols other than BLE (e.g., WiFi, Bluetooth, etc.).

What is claimed is:

1. A device comprising:
one or more antennas;
a plurality of Bluetooth Low Energy (BLE) transceivers, the plurality of BLE transceivers comprising:
a first BLE transceiver configured to receive a first BLE advertising signal on a first channel of a BLE frequency band,
a second BLE transceiver configured to receive a second BLE advertising signal on a second channel of the BLE frequency band different from the first channel, and
a third BLE transceiver configured to receive a third BLE advertising signal on a third channel of the BLE frequency band different from the first channel and the second channel,
wherein the first BLE transceiver, the second BLE transceiver, and the third BLE transceiver concurrently listen for BLE advertising signals on the first channel, the second channel, and the third channel, respectively; and processing logic communicatively coupled to the plurality of BLE transceivers, the processing logic configured to:
  determine data indicative of a distance from the device to a tag that is a source of one or more of the first BLE advertising signal, the second BLE advertising signal, or the third BLE advertising signal, and
  provide the data indicative of the distance to one of a location server or an asset management system.

2. The device of claim 1, wherein the data indicative of the distance comprises a signal strength.

3. The device of claim 2, wherein the first BLE transceiver of the plurality of BLE transceivers is configured to operate at a first transmission rate, and the second BLE transceiver of the plurality of BLE transceivers is configured to operate at a second transmission rate different from the first transmission rate.

4. The device of claim 1, wherein the first BLE transceiver is communicatively coupled to a first antenna, the second BLE transceiver is communicatively coupled to a second antenna, and the third BLE transceiver is communicatively coupled to a third antenna.

5. The device of claim 1, further comprising a splitter communicatively coupled to the first BLE transceiver, the second BLE transceiver, and the third BLE transceiver, wherein the splitter receives a signal from a single antenna and replicates the signal to the first BLE transceiver, the second BLE transceiver, and the third BLE transceiver.

6. The device of claim 5, further comprising a low-noise amplifier communicatively coupled to the antenna and the splitter.

7. The device of claim 6, further comprising a band pass filter, wherein the low-noise amplifier is communicatively coupled to the antenna via the band pass filter.

8. The device of claim 5, wherein the device further comprises:
  a power amplifier;
  a low-noise amplifier;
  an antenna array comprising a plurality of antennas;
  a band pass filter communicatively coupled to the antenna array, the power amplifier, and the low-noise amplifier;
  a low pass filter communicatively coupled to the power amplifier, the low-noise amplifier, and the splitter; and
  a microcontroller coupled to the splitter, the microcontroller configured to:
    select the power amplifier and bypass the low-noise amplifier when processing an outgoing signal; and
    select an antenna of the antenna array on which to transmit the outgoing signal.

9. The device of claim 1, further comprising a non-BLE transceiver, wherein:
  the first BLE transceiver, the second BLE transceiver, and the third BLE transceiver process signals according to a first protocol; and
  the non-BLE transceiver processes signals according to a second protocol different from the first protocol.

10. The device of claim 9, wherein the first protocol comprises a BLE protocol and wherein the second protocol comprises one of a Zigbee protocol, Bluetooth protocol, ANT protocol, ANT+ protocol, or Z-Wave protocol.

11. The device of claim 1, wherein a fourth BLE transceiver of the plurality of BLE transceivers is configured to communicate data over BLE channels other than channels 37, 38, and 39.

12. An access point comprising:
  a memory;
  one or more processors;
  one or more antennas;
  one or more wireless interfaces to communicatively couple the access point to one or more wireless client devices;
  a wired interface to communicatively couple the access point to a wired network;
  a plurality of Bluetooth Low Energy (BLE) transceivers, the plurality of BLE transceivers comprising:
    a first BLE transceiver configured to receive a first BLE advertising signal on a first channel of a BLE frequency band,
    a second BLE transceiver configured to receive a second BLE advertising signal on a second channel of the BLE frequency band different from the first channel, and
    a third BLE transceiver configured to receive a third BLE advertising signal on a third channel of the BLE frequency band different from the first channel and the second channel,
    wherein the first BLE transceiver, the second BLE transceiver, and the third BLE transceiver concurrently listen for BLE advertising signals on the first channel, the second channel, and the third channel, respectively; and
  processing logic communicatively coupled to the plurality of BLE transceivers, the processing logic configured to determine data indicative of a distance from the access point to a tag that is a source of one or more of the first BLE advertising signal, the second BLE advertising signal, or the third BLE advertising signal,
  wherein the memory stores instructions that, when executed, cause the one or more processors to obtain the data indicative of the distance and to provide the data indicative of the distance to a location server or an asset management system.

13. The access point of claim 12, wherein the data indicative of the distance comprises a signal strength.

14. The access point of claim 12, wherein the first BLE transceiver is communicatively coupled to a first antenna of the one or more antennas, the second BLE transceiver is communicatively coupled to a second antenna of the one or more antennas, and the third BLE transceiver is communicatively coupled to a third antenna of the one or more antennas.

15. The access point of claim 12, further comprising a splitter communicatively coupled to the first BLE transceiver, the second BLE transceiver, and the third BLE transceiver, wherein the splitter receives a signal from a single antenna and replicates the signal to the first BLE transceiver, the second BLE transceiver, and the third BLE transceiver.

16. The access point of claim 15, further comprising a low-noise amplifier communicatively coupled to the antenna and the splitter.

17. The access point of claim 16, further comprising a band pass filter, wherein the low-noise amplifier is communicatively coupled to the antenna via the band pass filter.

18. The access point of claim 15, further comprising:
  a power amplifier;
  a low-noise amplifier;
  an antenna array comprising a plurality of antennas;
  a band pass filter communicatively coupled to the antenna array, the power amplifier, and the low-noise amplifier;
  a low pass filter communicatively coupled to the power amplifier, the low-noise amplifier, and the splitter;
  a microcontroller coupled to the splitter, the microcontroller configured to:

select the power amplifier when processing an outgoing signal; and select an antenna of the antenna array on which to transmit the outgoing signal.

19. The access point of claim 12, wherein a fourth BLE transceiver of the plurality of BLE transceivers is configured to communicate data over BLE channels other than channels 37, 38 and 39.

20. A method comprising:

configuring, by one or more processors, a first BLE transceiver of a plurality of BLE transceivers to receive a first BLE advertising signal on a first channel of a BLE frequency band;

configuring, by the one or more processors, a second BLE transceiver of the plurality of BLE transceivers to receive a second BLE advertising signal on a second channel of the BLE frequency band different from the first channel;

configuring, by the one or more processors, a third BLE transceiver of the plurality of BLE transceivers to receive a third BLE advertising signal on a third channel of the BLE frequency band different from the first channel and the second channel;

concurrently listening, by the first BLE transceiver, the second BLE transceiver, and the third BLE transceiver, for BLE advertising signals on the first channel, the second channel, and the third channel, respectively;

determining data indicative of a distance from a device including the first BLE transceiver, the second BLE transceiver, and the third BLE transceiver to a tag that is a source of one or more of the first BLE advertising signal, the second BLE advertising signal, or the third BLE advertising signal; and providing the data indicative of the distance to a location server or an asset management system.

* * * * *